(12) United States Patent
Enseñat De Carlos

(10) Patent No.: US 9,016,315 B2
(45) Date of Patent: Apr. 28, 2015

(54) SELF-ADJUSTABLE MECHANISM FOR IRRIGATION EMITTERS

(75) Inventor: Luz Enseñat De Carlos, Madrid (ES)

(73) Assignee: Melcart Projects, S.L., Madrid (ES)

( * ) Notice: Subject to any disclaimer, the term of this patent is extended or adjusted under 35 U.S.C. 154(b) by 325 days.

(21) Appl. No.: 13/580,048

(22) PCT Filed: Feb. 19, 2010

(86) PCT No.: PCT/ES2010/000072
§ 371 (c)(1),
(2), (4) Date: Jan. 4, 2013

(87) PCT Pub. No.: WO2011/101497
PCT Pub. Date: Aug. 25, 2011

(65) Prior Publication Data
US 2013/0098487 A1    Apr. 25, 2013

(51) Int. Cl.
*A01G 25/16* (2006.01)
*F16K 31/00* (2006.01)
*B05B 3/04* (2006.01)
*B05B 15/04* (2006.01)
*B05B 15/10* (2006.01)

(52) U.S. Cl.
CPC . *F16K 31/00* (2013.01); *B05B 3/04* (2013.01); *B05B 15/04* (2013.01); *B05B 15/10* (2013.01)

(58) Field of Classification Search
CPC .................... A01G 25/162; A01G 25/165
USPC ............ 137/624.14, 624.15; 239/69, 70
See application file for complete search history.

(56) References Cited

U.S. PATENT DOCUMENTS

| 3,018,788 | A  | * | 1/1962 | Perlis .................. | 137/331 |
| 3,853,145 | A  | * | 12/1974 | Judd .................. | 137/624.18 |
| 4,116,216 | A  | * | 9/1978 | Rosenberg ............. | 137/624.13 |
| 7,152,814 | B1 | * | 12/2006 | Schapper et al. ........ | 239/520 |
| 2008/0054092 | A1 | * | 3/2008 | Alexander et al. ....... | 239/112 |

* cited by examiner

*Primary Examiner* — John K Fristoe, Jr.
*Assistant Examiner* — R. K. Arundale
(74) *Attorney, Agent, or Firm* — Hoglund & Pamias. PSC; Roberto J. Rios

(57) ABSTRACT

The invention relates to a mechanism, intended for assembly on an irrigation emitter, which includes a cylindrical housing (2) in which the pressure of the water flowing through the emitter moves a first disc-shaped part (3), thus rotating a tubular body (7) which in turn rotates a cylindrical part (9) which is connected to a second disc-shaped part (12), to which end screws (15) are connected, the extent to which said screws are tightened defining in the displacement and rotation of the parts the operation of the emitter during either one of the possible time periods relative to the total time commanded by the irrigation controller.

7 Claims, 2 Drawing Sheets

SELF-ADJUSTABLE MECHANISM FOR IRRIGATION EMITTERS

OBJECT OF THE INVENTION

The present invention relates to a self-regulating mechanism for irrigation emitters, planned so that the emitter wherein it is applied is able to irrigate 0%, 25%, 50%, 75% and 100% of the time commanded by the corresponding irrigation programmer, and all this regardless of the sector to which that emitter corresponds and of the angle of rotation of the same.

The object of the invention is to optimize the use of irrigation water in green areas and, therefore, to achieve water savings.

BACKGROUND OF THE INVENTION

The vast majority of the green areas, nearly 100% of which include grasses, have implemented automatic irrigation systems by sprinkler or diffusion, so that the water emitters (sprinklers, turbines or diffusers), are grouped, based on the available pressure, on irrigation sectors controlled by solenoid valves and commanded by a programmer. All emitters that belong to the same sector shall operate during the same period of time.

Currently the emitters existing in the market have several nozzles that simply provide greater or lesser extent (turning radius) and greater or lesser flow rate (pluviometry), these two factors being related in such a way that the greater the extent, the lesser the flow rate and vice versa.

On the other hand it is necessary to bear in mind that due to the irregularity of the geometry of the green spaces, the turning radius of the irrigation emitters belonging to the same sector is always different, from 360° to 90° or even less, which means that the area irrigated by the emitter that rotates 90° will receive four times the amount of water per m² than the area irrigated by the emitter that rotates 360°, at the same extent of both emitters. The result is that, so that the area irrigated by the 360° emitter does not dry out, it will be wasted four times the amount of water needed per m² in areas irrigated by 90° emitters.

It should also be highlighted the fact that several factors affect the water needs by m² in green areas, such as the soil type (clayey or sandy and changing in small spaces), or insolation (also changing over time and with the seasons).

However, a Rain Bird-type emitter is known which can be opened and closed so that it irrigates when desired, although the opening and/or closure operation is carried out manually by the actuation of a screw, which entails the need for intervention of an operator to perform this operation each time you want the emitter to change position, which obviously leads to a series of problems and disadvantages that are obvious, regardless of the complexity of the emitter as a whole.

DESCRIPTION OF THE INVENTION

The advocated mechanism has been designed to solve the problems previously raised and to achieve that the water emitter wherein it is applied to be able to irrigate during 25% of the programmed time, or during 50%, or 75%, and even irrigate during 100% of the programmed time, as well as not irrigating.

For this, the mechanism of the invention is constituted from a cylindrical housing that is mounted on the inside of the corresponding water emitter, for the passage of water through it, in which housing is internally mounted, with axial displacement faculty, a disc-shaped part that tends to be pushed against the direction of flow of the water by a spring, the force of which is overcome by the pressure of the water when it reaches and is passed through the emitter. This disc-shaped part is affected by a concentric step in which are positioned a tubular body with a section of the same externally affected by helical knurls complementary of others established to this effect at the passage of the disc-shaped piece, such that the axial displacement of this will oblige the tubular body to perform a movement of rotation that will be of 90° and to the left.

Inside said tubular body is mounted, with interposition of a sliding bearing, a stem belonging to a cylindrical part located on the other side of the disc-shaped part, while said cylindrical part is equipped with a lateral fin as stop element to limit the rotation of the same 90°, which cylindrical part is dragged in rotation by the tubular body of the knurls and in combination with a second disc-shaped part attached on the end opposite to the stem, the opening and closure of the own irrigation emitter will be established. The aforementioned second disc-shaped part incorporates a pair of radially protruding parts which limit the rotation of the cylindrical part, preventing this from rotating in the opposite direction when the water pressure in the emitter stops, acting therefore these lateral parts of the second disc-shaped part as non-return valves of the cylindrical part.

The arrangement of the parts mentioned, corresponds to the direction of movement of water, according to the referred order of the same, i.e. the first disc-shaped part is situated in a lower area of the emitter, while the second disc-shaped part with the parts that act as non-return valves, will be situated in an upper area of the emitter, specifically in close proximity to the outlet end of the same.

At the aforementioned upper end of the emitter are mounted four screws out of step with each other at 90°, which are related with the second disc-shaped part for setting the irrigation percentage that you want to assign to the emitter and that will be previously selected by the action on one or another of these screws.

At the rotation of the cylindrical part carrying the stem, the lateral fin of the same may or may not stop on one or another screw, according to the tightening of these to a greater or lesser extent, and setting the emitter closure or opening so that it irrigates, or does not irrigate, or well setting positions in the screws so that they irrigate during 25%, 50%, or 75% of the total programmed time.

DESCRIPTION OF THE DRAWINGS

To complement the description that will be carried out next and to help to a better understanding of the features of the invention, in accordance with a preferred example of practical embodiment of the same, a set of drawings is accompanied as an integral part of said description, wherein with illustrative character and without limitation, the following has been represented.

PREFERRED EMBODIMENT OF THE INVENTION

Figure 1:
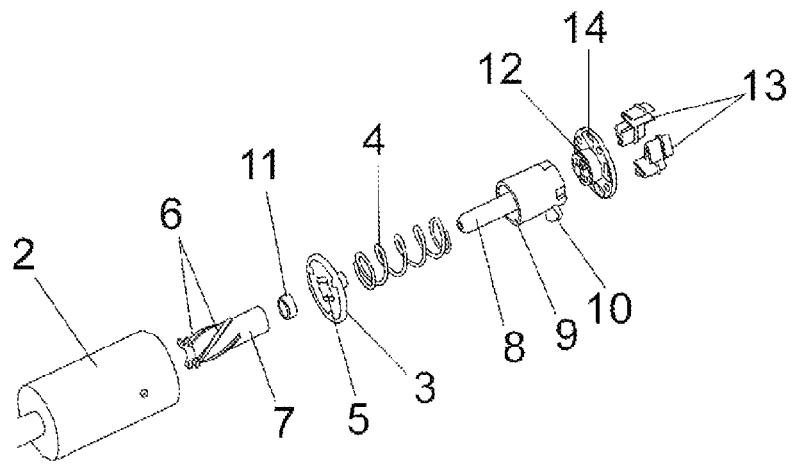
FIG. 1.—It shows a plot according to a general perspective of the different elements and/or parts involved in the constitution of the mechanism object of the invention.

Based on the above figures, it can be seen how the mechanism of the invention, applicable to irrigation emitters, specifically for their installation in correspondence with the top end section (output) of the own emitter (1), comprises a cylindrical housing (2) intended to house all the parts of the mechanism, establishing a watertight compartment in which water will enter through the bottom part and will exit through the top part, according to the normal position of application and use of the emitter (1) in which it is mounted.

Inside said cylindrical housing (2) there is mounted a first disc-shaped part (3) with axial displacement faculty, such that every time the emitter receives the water pressure, said disc-shaped part (3) moves upwards against the force of a spring (4) that will move it in the opposite direction, towards the resting position, when the water pressure stops. Said first disc-shaped part (3) is affected by a concentric step (5) with internal knurls complementary to other helical knurls (6) planned on the outer surface of a section corresponding to a tubular body (7) in such a way that the upward axial displacement of the first disc-shaped part (3), due to the pressure of the water, will force the tubular body (7) to perform a movement of rotation of 90° to the left by the arrangement or orientation given to the aforementioned helical knurls.

The cessation of pressure will result in the push by the spring (4), of the first disc-shaped part to its original position, i.e. in downward direction and thereby the rotation in the opposite direction of the tubular body (7).

In addition, a stem (8) belonging to a cylindrical part (9) equipped with a lateral fin (10) is housed in said tubular body (7), which is obviously of a cylindrical configuration, and the stem (8) is snap coupled inside the tubular body (7) with the collaboration of a sliding bearing (11). Associated to the cylindrical part (9) a second disc-shaped part (12) has been planned to establish in combination the opening and/or closure situations of the own emitter (1).

Associated to the second disc-shaped part (12), lateral parts (13) have been planned that will function as a non-return valve of the cylindrical part (9), such that this will rotate only in one direction and always at the same angle, specifically 90° to the left, every time the emitter receives water pressure.

Figure 6:
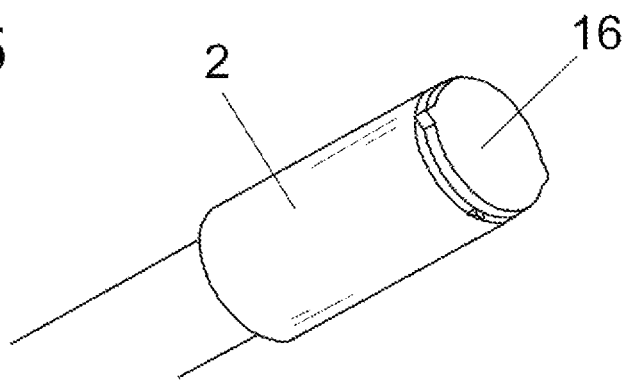
FIG. 6.—Finally, it shows a view as the one of the previous figure, with the cylindrical housing of the mechanism and a closing extreme lid for hiding the screws.

For its part, the second disc-shaped part (12) is affected by four holes (14), angularly equidistant to each other, for mounting two end screws (15), these being located in the upper part of the emitter (1) and hidden by a closing lid (16), as shown in FIG. 6, such that according to the tightening to a greater or lesser extent of such end screws (15), individually and independently, the form of operation of the emitter will be established to operate 0%, 25%, 50%, or 75% of the time with respect to the total time commanded by the irrigation program.

Figure 2:
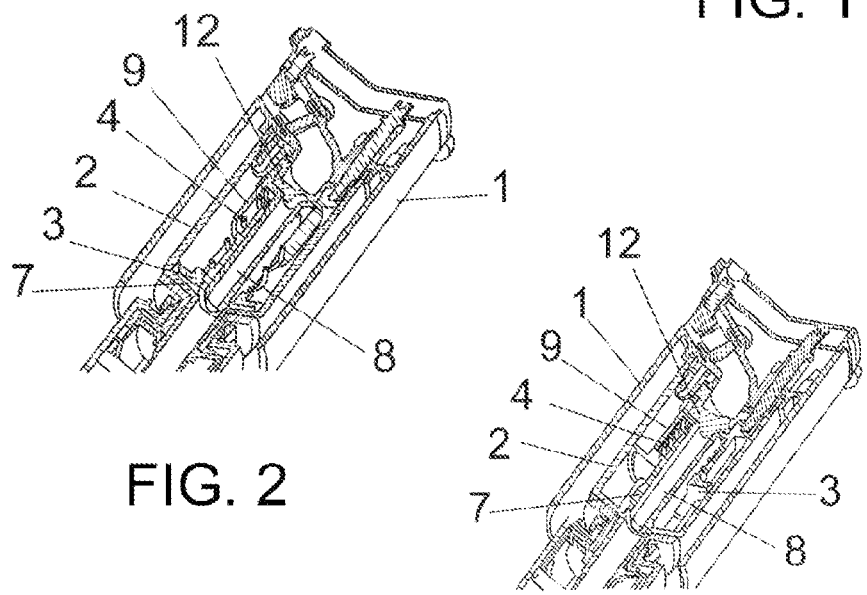
FIG. 2.—It shows a longitudinal perspective and section plot of the mechanism of the invention mounted on an emitter, in the position in which it has no pressure.
Figure 3:
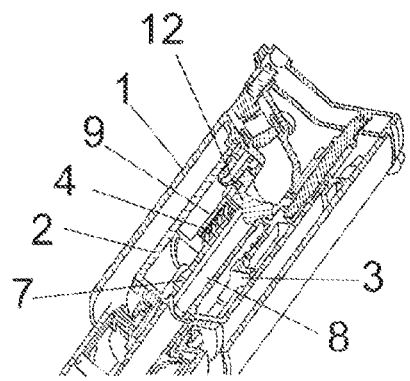
FIG. 3.—It shows a plot according to a section perspective as the one in the previous figure, in the closing position.
Figure 4:
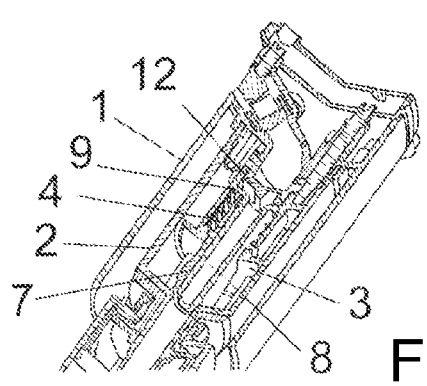
FIG. 4.—It shows a plot according to a section perspective, as the one in the two previous figures, in the opening position.
Figure 5:
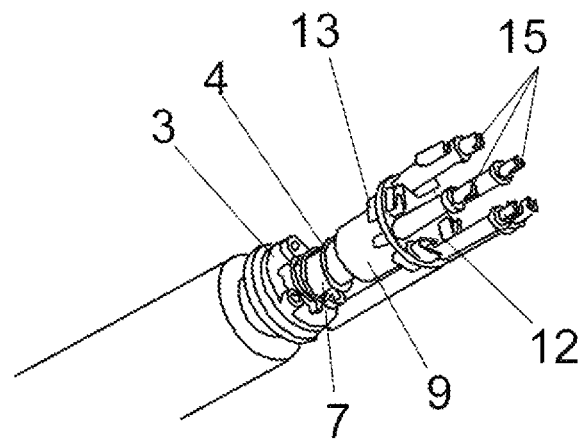
FIG. 5.—It shows an external general perspective view of the mechanism of the invention without the cylindrical housing and with the screws at the end of the same.

According to the aforementioned characteristics, and taking into account what is shown in FIGS. 2, 3 and 4, which correspond to the "without pressure", "close" and "open" positions, respectively, and also taking into account what is represented in FIG. 5, the operation is as follows:

When the water flow rate reaches the emitter (1), due to that the programmer has opened the corresponding valve, the water enters inside the housing, pushing the first disc-shaped part (3) upwards, overcoming the spring (4) pressure, forcing in this displacement the tubular body (7) to rotate 90° to the left, dragging with it the cylindrical part (9) in its upward rotation motion, at which time, two things can happen:

1.—The fin (10) of the cylindrical part (9) hits the assigned screw (15) in that pressure surge of the top part, since this will be tight because it "was meant" to irrigate, corresponding in this case to the "open position", all so that the inside of the cylindrical part (9) through which the water circulates does not collide with the second disc-shaped part (12), so the water flow passes unimpeded through the holes established for that purpose in that disc-shaped part (12), making the emitter irrigate.

2.—The fin (10) of the cylindrical part (9) does not hit the assigned screw (15) in that pressure surge of the top part, since it was not tight because it "was not meant" to irrigate, corresponding in this case to that of the "closed position". Inside the cylindrical part (9) through which the water circulates, it collides creating a seal in combination with an o-ring against the inside of the second disc-shaped part (12) whereby the current remains retained and the emitter does not irrigate.

When the water pressure stops, because the programmer closes the corresponding solenoid valve, the spring (4) forces the first disc-shaped part (3) to descend, which in turn drags the tubular body (7) to its original position, forcing it to make a 90° turn to the right, while the cylindrical part (9) is not dragged by the tubular body (7) thanks to the parts (13) linked to the second disc-shaped part (13), which has no movement, then acting as non-return valves of that cylindrical part (9).

For practical purposes of use, the operator who installs the irrigation emitter with the referred mechanism will only have to:

Tighten the four screws (15) at the top of the emitter so that it irrigates 100% of the time.

Tighten three of the four screws (15) at the top of the emitter so that it irrigates 75% of the time.

Tighten two of the four screws (15) at the top of the emitter so that it irrigates 50% of the time.

Tighten one of the four screws (15) at the top of the emitter so that it irrigates 25% of the time.

Do not tighten any of the four screws (15) at the top of the emitter so that it irrigates 0% of the time.

The invention claimed is:

1. A self-regulating mechanism for irrigation emitters, which being planned to allow an irrigation emitter to operate at specific fractions of the entire time commanded by the corresponding irrigation programmer, with the purpose of optimizing the use of irrigation water and thereby reducing irrigation water consumption, is characterized in that the mechanism is constituted from a cylindrical housing (2) that is arranged on the inside of the corresponding emitter (1), for the passage of water through the emitter, the cylindrical housing (2) which sets a watertight compartment through which water will pass in an upward direction and inside of the housing is mounted a first disc-shaped part (3) that can be axially displaced via water pressure in upward direction against a spring (4), the first disc-shaped part (3) having a concentric hole (5) which includes helical knurls (6) for positioning a cylindrical body (7) having corresponding helical knurls such that the axial displacement of said disc-shaped part (3) produces a rotational movement of the tubular body (7) that causes a corresponding rotation of a cylindrical part (9) with an axial stem (8) snap coupled on the cylindrical body (7), such cylindrical part (9) relating to a second disc-shaped part (12) located above and having four holes (14)

equally spaced from each other for mounting respective end screws (15), the greater or lesser tightening of which screws sets the operation for one or another period of time of the irrigation emitter with respect to the total time, commanded by the irrigation programmer.

2. The self-regulating mechanism for irrigation emitters, according to claim 1, characterized in that the cylindrical part (9) is equipped with an external lateral fin (10) as a stop for limiting the rotation of the cylindrical part (9).

3. The self-regulating mechanism for irrigation emitters, according to claim 1, characterized in that the second disc-shaped part (12) includes a pair of lateral part non-return valves (13).

4. The self-regulating mechanism for irrigation emitters, according to claim 1, characterized in that the rotational movement of the cylindrical part (9) produced by the upward displacement of the first disc-shaped part (3) is of 90° and to the left.

5. The self-regulating mechanism for irrigation emitters, according to claim 2, characterized in that the inner end of each of the screws (15) establishes, in accordance with their degree of tightening, a stop for the lateral fin (10) of the cylindrical part (9) and determining one or another opening period of the emitter during the entire irrigation time commanded by the irrigation programmer.

6. The self-regulating mechanism for irrigation emitters, according to claim 2, characterized in that the rotational movement of the cylindrical part (9) produced by the upward displacement of the first disc-shaped part (3) is of 90° and to the left.

7. The self-regulating mechanism for irrigation emitters, according to claim 3, characterized in that the rotational movement of the cylindrical part (9) produced by the upward displacement of the first disc-shaped part (3) is of 90° and to the left.

\* \* \* \* \*